United States Patent
Verdun (10) Patent No.: US 6,751,739 B1
(45) Date of Patent: Jun. 15, 2004

(54) SYSTEM AND METHOD FOR ADJUSTING A MEMORY POOL CONFIGURATION BY ASSESSING TASK PERFORMANCE OF A SPECIFIED APPLICATION

(76) Inventor: Gary J. Verdun, 23 Overlook Dr., Belton, TX (US) 76513

( * ) Notice: Subject to any disclaimer, the term of this patent is extended or adjusted under 35 U.S.C. 154(b) by 0 days.

(21) Appl. No.: 09/490,795

(22) Filed: Jan. 24, 2000

(30) Foreign Application Priority Data

Jan. 17, 2000 (JP) ........................................ 2000-007710

(51) Int. Cl.⁷ ................................................ G06F 1/32
(52) U.S. Cl. ..................... 713/300; 713/320; 711/105; 711/170; 711/173
(58) Field of Search ..................... 711/5, 105, 170–173; 713/300, 310, 320, 324

(56) References Cited

U.S. PATENT DOCUMENTS

| | | | |
|---|---|---|---|
| 5,404,546 A | | 4/1995 | Stewart |
| 5,410,711 A | | 4/1995 | Stewart |
| 5,504,907 A | | 4/1996 | Stewart et al. |
| 5,524,248 A | | 6/1996 | Parks et al. |
| 5,603,040 A | | 2/1997 | Frager et al. |
| 5,615,162 A | * | 3/1997 | Houston ...................... 365/226 |
| 5,675,814 A | | 10/1997 | Pearce |
| 5,928,365 A | * | 7/1999 | Yoshida ...................... 365/222 |
| 5,944,831 A | | 8/1999 | Pate et al. |
| 5,958,058 A | * | 9/1999 | Barrus ......................... 713/320 |
| 6,038,673 A | * | 3/2000 | Benn et al. .................. 713/323 |
| 6,079,023 A | * | 6/2000 | Yoon et al. .................. 711/106 |
| 6,131,166 A | * | 10/2000 | Wong-Insley ................ 709/328 |
| 6,226,729 B1 | * | 5/2001 | Stevens et al. .............. 711/171 |
| 6,330,639 B1 | * | 12/2001 | Fanning et al. ............. 365/222 |
| 6,442,698 B2 | * | 8/2002 | Nizar .......................... 713/320 |

FOREIGN PATENT DOCUMENTS

| | | | | |
|---|---|---|---|---|
| EP | 0843472 | | 5/1998 | |
| EP | 974908 A2 | * | 1/2000 | ........... G06F/12/10 |

OTHER PUBLICATIONS

Rambus Inc. Rambus RIMM Module (with 64/72Mb RDRAMs), Jul. 1999, Version 1.0, p. 7.*

Intel 820 Chipset: A Revolutionary Architecture For Mainstream Performance PCs in 2000, ftp://download.intel.com/design/chipsets/820/820white.pdf.

* cited by examiner

*Primary Examiner*—Jeffrey Gaffin
*Assistant Examiner*—Mark Connolly
(74) *Attorney, Agent, or Firm*—Baker Botts L.L.P.

(57) ABSTRACT

A method and related computer system that allow recalling at least one memory pooling profile, in response to user input, and pooling data processing system memory devices in response to the at least one memory pooling profile.

10 Claims, 9 Drawing Sheets

Graphical User Interface 150

Application Specification 100

| Categories | Please Select One or More |
|---|---|
| Word Processing | O |
| Palm-Top Organizer | O |
| Calendar Program | O |
| Web Browser | O |
| Communications Package | O |
| Voice Recognition | O |
| Spread Sheet | O |

Performance/Power Levels Specification 102

| Categories | Please Select One |
|---|---|
| Maximum performance | O |
| Standard Performance -- High End | O |
| Standard Performance -- Low End | O |
| Maximum Battery Life | O |

Figure 1A

Graphical User Interface 150

Application Specification 100

Categories             Please Select One or More

- Word Processing     O
- Palm-Top Organizer     O
- Calendar Program     O
- Web Browser     O
- Communications Package     O
- Voice Recognition     O
- Spread Sheet     O

Performance/Power Levels Specification 102

Categories             Please Adjust Slider Maximum performance
Standard Performance -- High End
Standard Performance -- Low End
Maximum Battery Life

SYSTEM AND METHOD FOR ADJUSTING A MEMORY POOL CONFIGURATION BY ASSESSING TASK PERFORMANCE OF A SPECIFIED APPLICATION

BACKGROUND OF THE INVENTION

1. Field of the Invention

The present invention relates, in general, to power management of memory devices in data processing systems.

2. Description of the Related Art

Data processing systems are systems that manipulate, process, and store data and are notorious within the art. Personal computer systems, and their associated subsystems, constitute well known examples of data processing systems.

Personal computer systems typically utilize memory devices. One type of memory device so utilized is known in the art as RAMBUS Dynamic Random Access Memory, or RDRAM. RDRAM is a proprietary type of computer memory developed by Rambus, Inc. of Mountain View, Calif., and has been adopted for use by Intel Corporation of Santa Clara, Calif.

Operation of RDRAM computer memory devices consumes considerable amounts of power and produces considerable amounts of heat. In many data processing systems (e.g., portable computer systems such as notebook and subnotebook computer systems) power and heat management constitute significant design concerns. These power and heat management design concerns have been recognized by RDRAM designers and developers, and thus the RDRAM specification provides defined power management polices.

The inventor named herein has discovered, and such discovery forms part of the inventive content described herein, that RDRAM power management policies can be used in conjunction with defined user scenarios in order to provide specific users with near-optimum power management and performance.

SUMMARY OF THE INVENTION

The inventors named herein have devised a method and related computer system that allow power management policies can be used in conjunction with defined user scenarios in order to provide specific users with near-optimum power management and performance.

In one embodiment, a method and related computer system allow recalling at least one memory pooling profile, in response to user input, and pooling data processing system memory devices in response to the at least one memory pooling profile.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art referencing the accompanying drawings.

The use of the same reference symbols in different drawings indicates similar or identical items.

DESCRIPTION OF THE PREFERRED EMBODIMENT(S)

The following sets forth a detailed description of the best contemplated mode for carrying out the independent invention(s) described herein. The description is intended to be illustrative and should not be taken to be limiting.

It has been discovered by the inventor named herein that various computer software applications have memory requirements that differ from each other. It has also been discovered that individual computer users typically tend to utilize only a certain limited number of such computer applications. For example, a business traveler utilizing a portable computer on a plane may typically only utilize his word-processing software. The inventor named herein has devised a process and device that manage RAMBUS memory pools based upon user input specifying what particular applications program(s) the user is most likely to utilize and what power/performance levels the user prefers to experience when running the particular applications program(s). The process and device make use of various empirically determined pooling profiles in order to manage RAMBUS memory pools in a fashion such that substantially optimum power management for individual users can be achieved.

The Rambus RDRAM specification defines RDRAM power draw specifications in the Rambus Direct RDRAM 128/144-Mbit (256K×16/18×32s) Specification, available from the RAMBUS Corporation of Mountain View, Calif., USA, hereby incorporated by reference in its entirety, as follows:

TABLE 1

| RDRAM Memory Status | $I_{DD}$ | Response Time |
|---|---|---|
| Active | 100% (≅148 mAmps) | ≅substantially immediate -- 1–4 bus clock cycles |

TABLE 1-continued

| RDRAM Memory Status | $I_{DD}$ | Response Time |
|---|---|---|
| Standby | 68% (≈101 mAmps) | ≈intermediate response time -- ≈10–20 bus clock cycles |
| Nap State | 3% (≈4.2 mA) | ≈very long response time -- ≈100 ns |

Intel Corporation has included RDRAM in its chipsets, and has extended the power management capabilities associated with RDRAM. Specifically, Intel has allowed designers the ability to specify "pools" of RDRAM devices. An example of such pool specifications, drawn from the Intel 820 Chipset: 82820 Memory Controller Hub (MCH) Specification, available from the Intel Corporation of Santa Clara, Calif., USA hereby incorporated by reference in its entirety, is as follows:

TABLE 2

| | Pool A -- Up to 8 RDRAM Devices, only 4 of which can be active at any one time | Pool B -- By definition those RDRAM devices not in Pool A |
|---|---|---|
| Device Status | Either Active or Standby | Nap Mode |

Intel Corporation lets the designer specify how many devices are in Pool A or Pool B at any one time. The inventor named herein has discovered that he can dynamically manage the number of devices in the pools in response to user input such that near-optimum power management with respect to such memory devices is achieved.

Figure 1A:
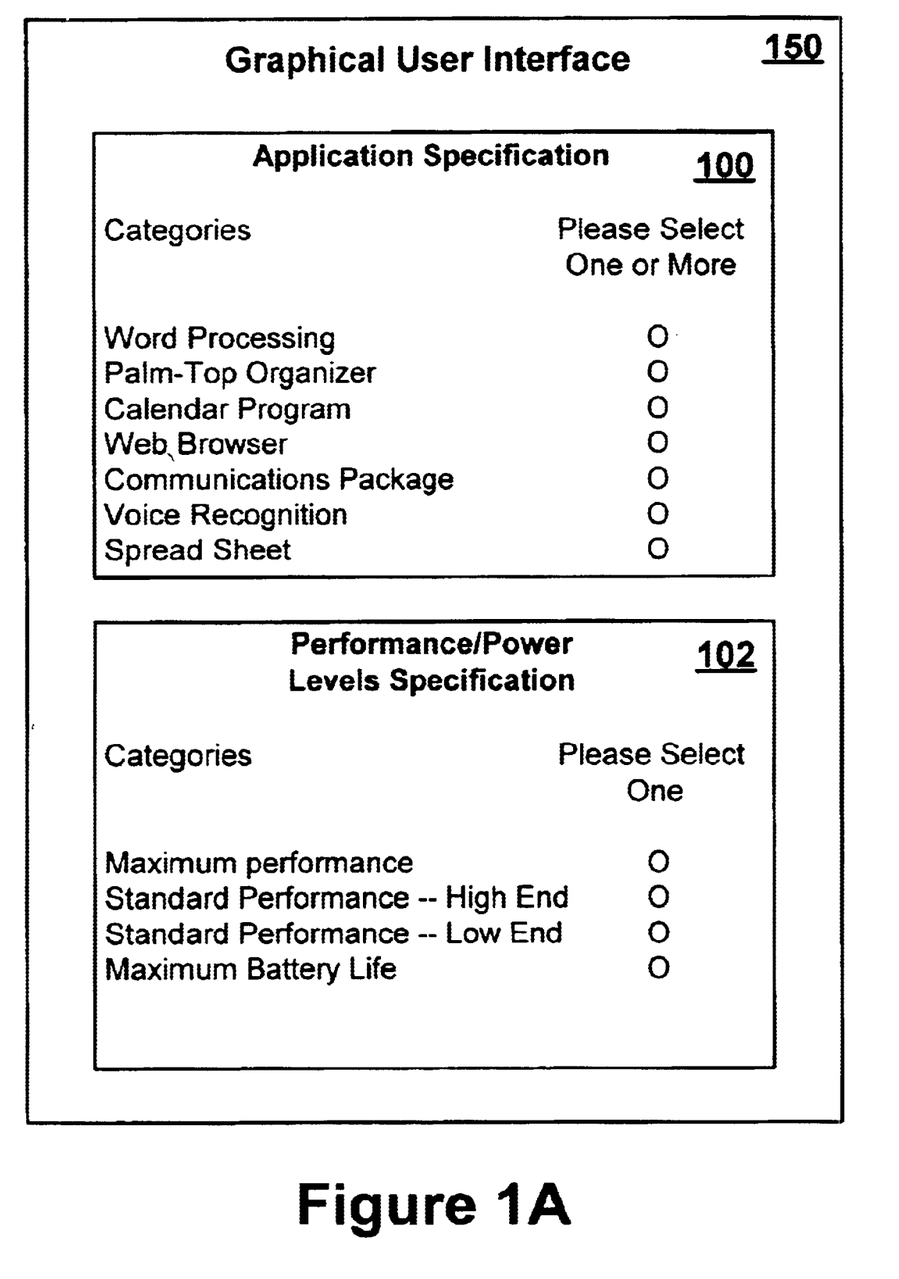
FIG. 1A shows an illustration of graphical user interface 150 having selectable options.

With reference now to FIG. 1A, shown is an illustration of graphical user interface 150 having selectable options in accord with the present invention. Depicted is application specification box 100. As noted, the user is given the option to select the applications which the user is most likely to use. Illustrated in application specification box 100 are a few examples of the options the user may select, such as word processing, palm-top organizer, calendar program, web browser, communications package, voice recognition program, spread sheet, etc.

Also shown is performance/power levels specification box 102. Depicted is that the user is given several options, such as maximum performance, standard performance—high end, standard performance—low end (slightly worse standard performance, but with more battery life), and maximum battery life. In one embodiment, "maximum performance" refers to memory device pooling such that users discernible response time is substantially minimized for the one or more selected applications, and will generally represent the maximum power draw for the one or more selected applications, "standard performance—high end" (slightly better standard performance, but having less battery life) refers to memory pooling such that what is defined as "minimal" user discernible performance degradation will be present for the one or more selected applications, "standard performance—low end" (slightly worse standard performance, but having more battery life) refers to memory pooling such that what is defined as "minimal" user discernible performance degradation will be present for the one or more selected applications, while "maximum battery life" refers to memory pooling such that there is "noticeable" user detectable performance degradation but which is acceptable to users for the sake of substantially minimizing battery drain for the sake of maximizing battery life.

Figure 1B:
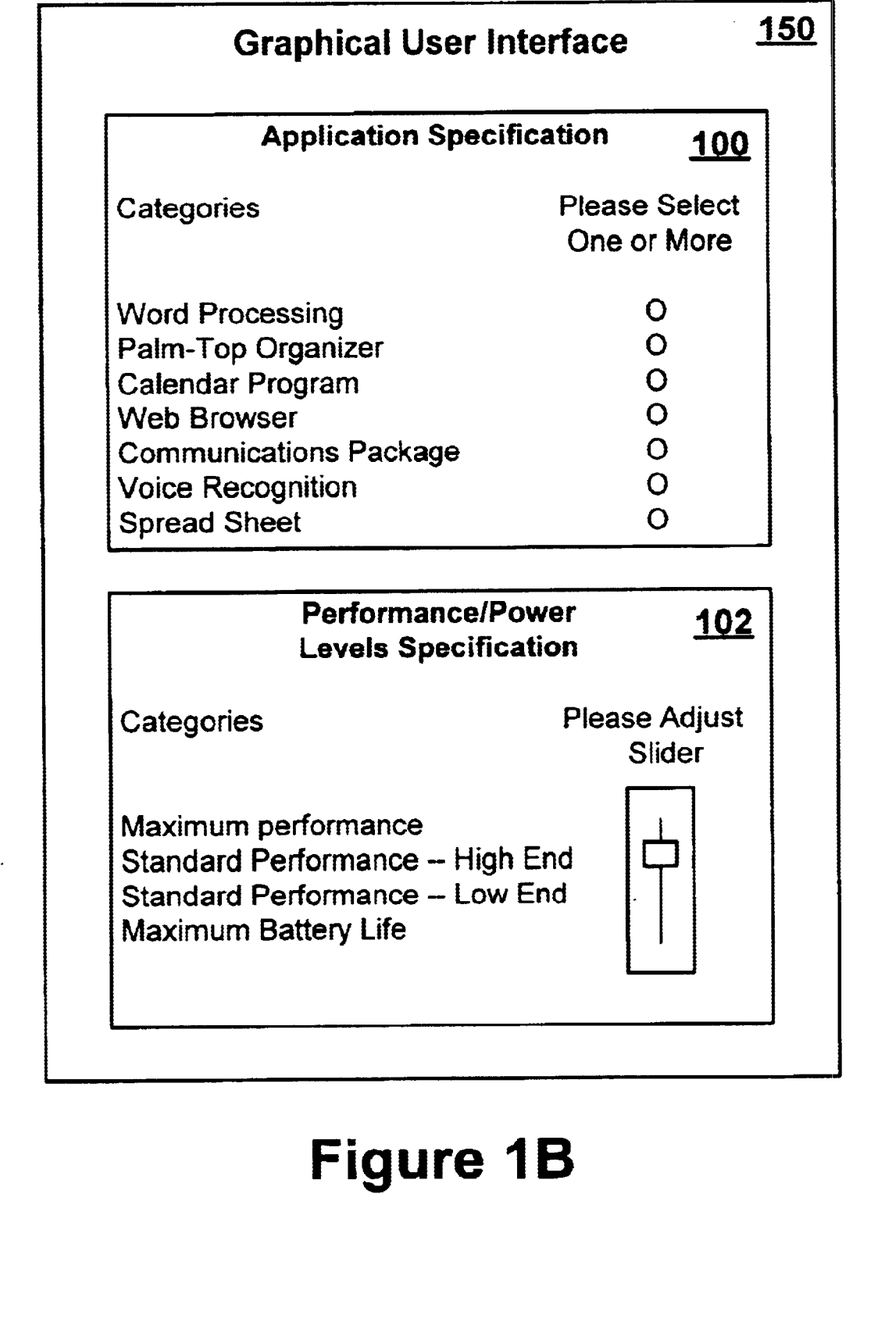
FIG. 1B shows graphical user interface 150, but with the discrete choice fields of performance/power levels specification box 102 replaced with "slider" 104.

Referring now to FIG. 1B, shown is graphical user interface 150 of FIG. 1A, but with the dessert choice fields of performance/power levels specification box 102 replaced with "slider" 104. "Slider" 104 allows slightly more fine adjustment than that available via the discrete selections available as shown in FIG. 1A.

In addition to the foregoing, in another embodiment, the presence of AC power to the system is monitored, and in the event that AC power becomes available the system automatically switches to maximum performance mode, since with AC power present it can generally be assumed that power management is not as critical as when battery power is in use.

Figure 2:
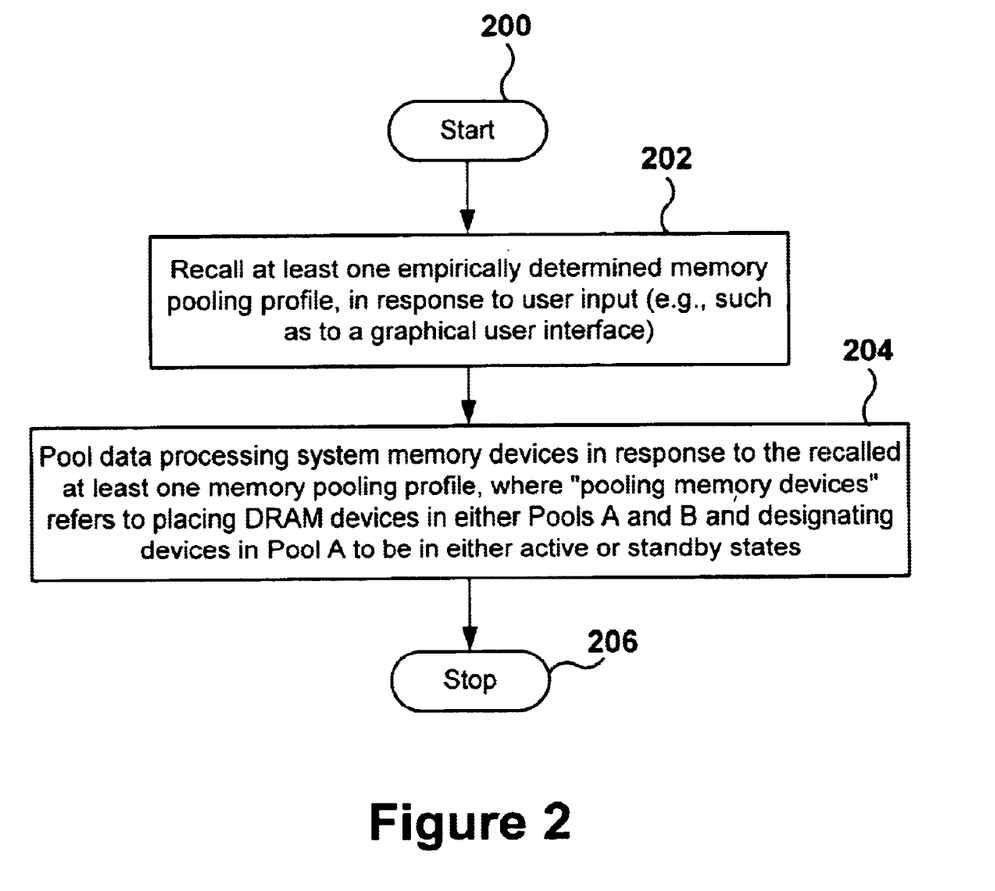
FIG. 2 shows a process illustrating that in response to user input to a application specification box 100 and performance/power levels specification box 102, the number of devices in memory pool A and pool B will be adjusted to meet certain user requirements.

Referring now to FIG. 2, shown is a process illustrating that in response to user input to application specification box 100 and performance/power levels specification box 102, the number and/or state of devices in memory pool A and pool B (see table 2) will be adjusted to meet certain user requirements. Method step 200 shows the start of the process. Method step 202 depicts recalling at least one empirically determined memory pooling profile, in response to user input such as that illustrated in relation to graphical user interface 150 in FIG. 1. That is, subsequent to a human user selecting one or more application programs to be run and a power/performance level at which the data processing system running the selected applications programs is to perform, the at least one empirically determined memory pooling profile is recalled. Thereafter, method step 204 shows pooling data processing system memory devices in response to the at least one memory pooling profile, where "pooling memory devices" refers to placing RDRAM devices in either Pools A and B and designating devices in pool A to be in either active or standby states. Subsequently, shown is that the process proceeds to method step 206 and stops.

As was noted above, application specification box 100 of FIG. 1 allows the selection of more than one specific application. In one embodiment, when the user specifies a performance/power level via performance/power levels specification box 102, the pooling profile referred to in method step 202 consists of an average is drawn on the individual pooling profiles for each of the applications selected (e.g., if word processing and spread sheet are selected, and the performance/power level is specified to be standard—high end, devices activated will be the average of the standard—high end device for both the spreadsheet and word processor. Alternatively, in another embodiment, application specific pooling profiles are activated in response to activation of individual ones of the selected application programs. Yet still alternatively again, of the pooling profiles associated with the one or more application programs selected, that pooling profile having the most active memory devices is the one selected.

Figure 3:
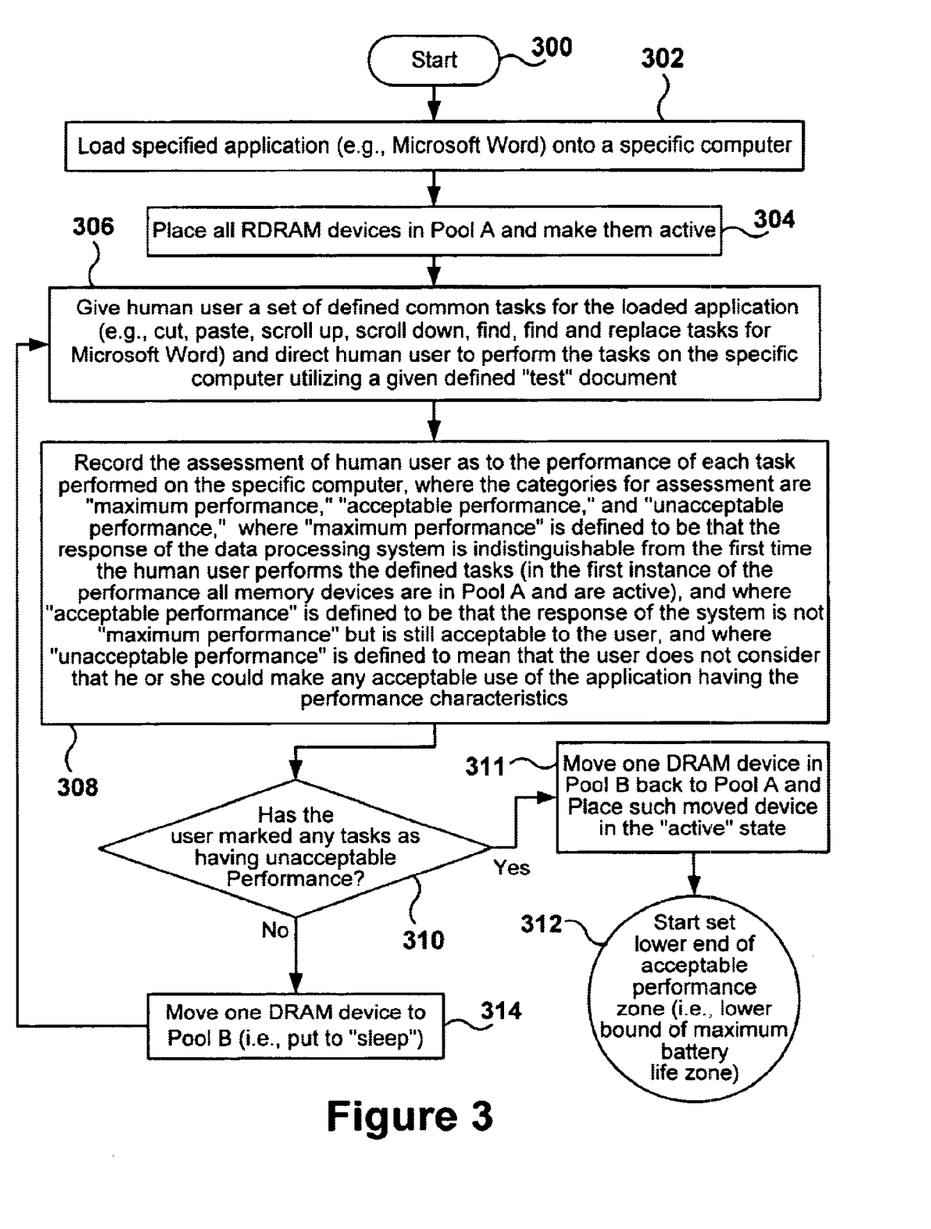
FIGS. 3 and 4 illustrate how a lower bound pooling policy of a maximum battery life zone is determined.

Referring now to FIG. 3, shown is a process by which a portion of the various performance/power levels referred to above are determined for various applications. Method step 300 shows the start of the process. Method step 302 depicts that a specified application (e.g., Microsoft Word) is loaded onto a specific computer (e.g., a portable computer system that utilizes Rambus DRAM). Method step 304 illustrates that all RDRAM devices in the specific computer are placed in pool A (see table 2) and made active. Method step 306 shows that a human user is given a set of defined common tasks for the loaded application (e.g., cut, paste, scroll up, scroll down, find, find and replace tasks for Microsoft Word) and asked to perform the tasks on the data processing system utilizing a given defined "test" document. Method step 308 illustrates that the human user is instructed to record the performance as maximum performance for each task performed in specific recordation categories, where the recordation categories are for assessment are "maximum performance," "acceptable performance," and "unacceptable performance," where "maximum performance" is defined to be that the response of the data processing system is indistinguishable from the first time the human user performs the defined tasks (in the first instance of the performance all memory devices are in Pool A and are active), and where "acceptable performance" is defined to be that the response of the system is not "maximum performance" but is still acceptable to the user, and where "unacceptable performance" is defined to mean that the user does not consider that he or she could make any acceptable use of the application having the performance characteristics. That is, the human user is instructed that performance of the application the first time through, with all possible memory devices activated, is the "baseline" performance against which subsequent performances of the application are to measured, and thus the first time though the process described in relation to FIG. 3, the user is to mark all tasks as having "maximum performance."

Method step 310 shows the inquiry as to whether the user has marked any task as having "unacceptable performance." If the inquiry of method step 310 yields a determination that a task was marked unacceptable, the process proceeds to method step 311, which shows that one DRAM is moved back to Pool A and set "active" (in order to restore the system to the last state in which it had acceptable performance. Thereafter, the process proceeds to method step 312 which illustrates the start of the "set lower bounds of acceptable performance zone process" (which is equivalent to setting the lower bounds of a maximum battery life zone, as is explained below) of FIG. 4.

If the inquiry of method step 310 yields a determination that a task was NOT marked unacceptable, the process proceeds to method step 314 which illustrates that one DRAM device is moved to pool B (i.e., put to "nap"). Thereafter, the process returns to method step 306 and continues from that point.

Figure 4:
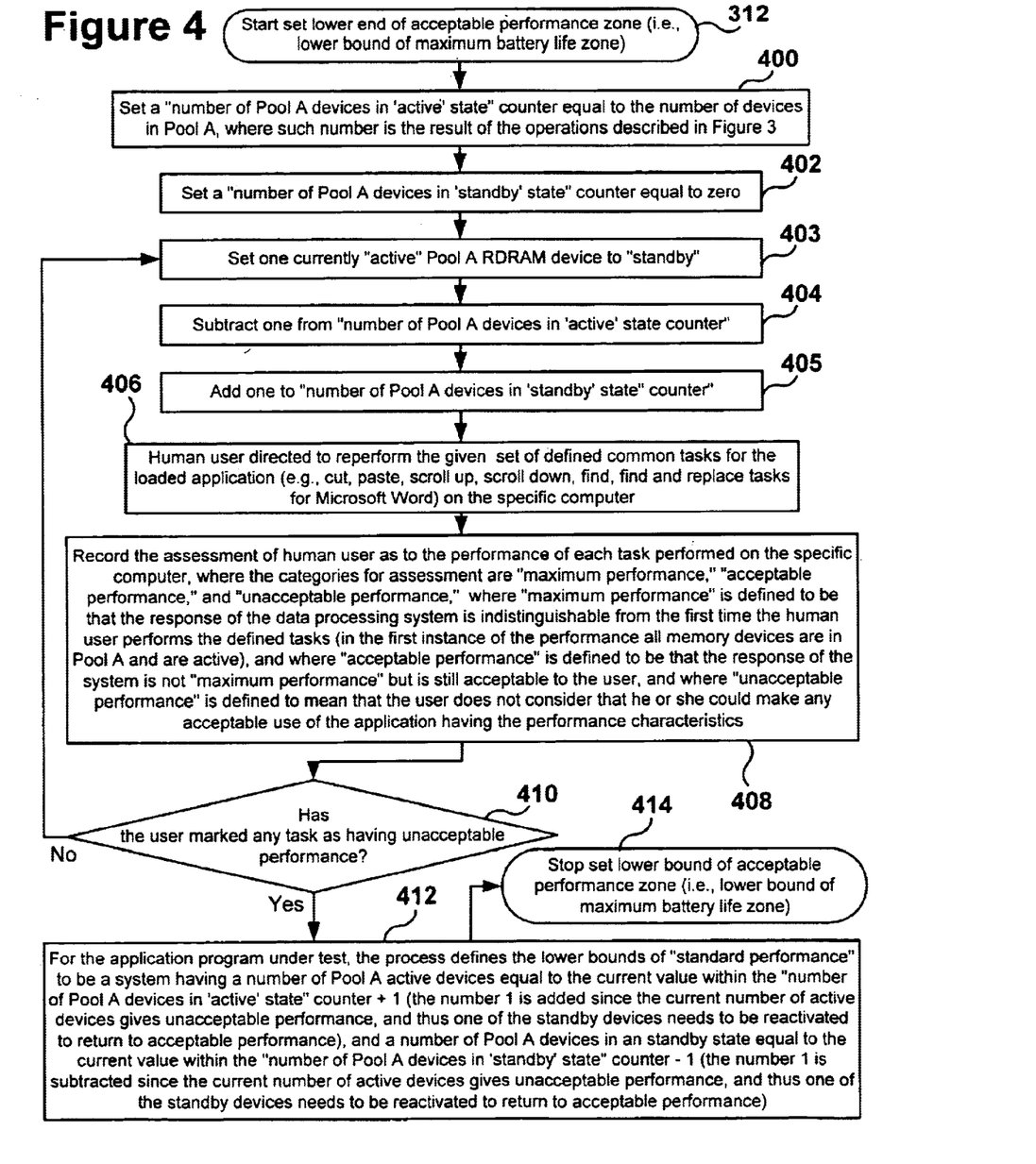

At the completion of the process shown in FIG. 3, it is known what minimum number of active pool A memory devices is necessary to obtain the performance that the user finds acceptable (i.e., the number of active memory devices in Pool A when the process described in FIG. 3 terminates and proceeds to FIG. 4).

With reference now to FIG. 4, illustrated is "set lower end of acceptable performance zone process." Recall that pool A devices can be placed into an "standby" mode, which actually consumes less power than active mode. The process of FIG. 3 gave the minimum number of active devices in pool A required for acceptable performance. The process of FIG. 4 determines how many (if any) of such minimum number of active devices can be placed in standby state before the user finds the performance of the system unacceptable. Accordingly, method step 400 shows setting a "number of pool A devices in 'active' state" counter equal to the number of devices in pool A, where such number is the result of the operations described in FIG. 3. Method step 402 shows setting a "number of pool A devices in 'standby' state" counter equal to zero. Thereafter, method step 403 depicts setting one currently "active" pool A RDRAM device to "standby." Subsequently, in response to the operation depicted in method step 403, method step 404 illustrates subtracting one from a "number of pool A devices in 'active' state" counter. Thereafter, again, in response to the operation depicted in method step 403, method step 405 shows adding one to the "number of pool A devices in 'standby' state" counter.

Method steps 406–410 function in substantially the same fashion as method steps 306–310, described above. In the event that the inquiry of method step 410 yields determination that the user has marked the performance of at least one task unacceptable, the process proceeds to method step 412, wherein is depicted that for the application under test, the process defines the lower bounds of "acceptable performance" to be a system having a number of pool A active devices equal to the current value within the "number of pool A devices in 'active' state" counter +1 (the number 1 is added since the current number of active devices gives unacceptable performance, and thus one of the standby devices needs to reactivated to return to acceptable performance), and a number of pool A devices in an standby state equal to the current value within the "number of pool A devices in 'standby' state" counter −1 (the number 1 is subtracted since the current number of active devices gives unacceptable performance, and thus one of the standby devices needs to reactivated to return to acceptable performance). Thereafter, the process proceeds to method step 414 and stops.

In the event that the inquiry of method step 410 yields determination that the user has NOT marked the performance of at least one task unacceptable, the process proceeds to method step 403 and proceeds from that point.

Figure 5:
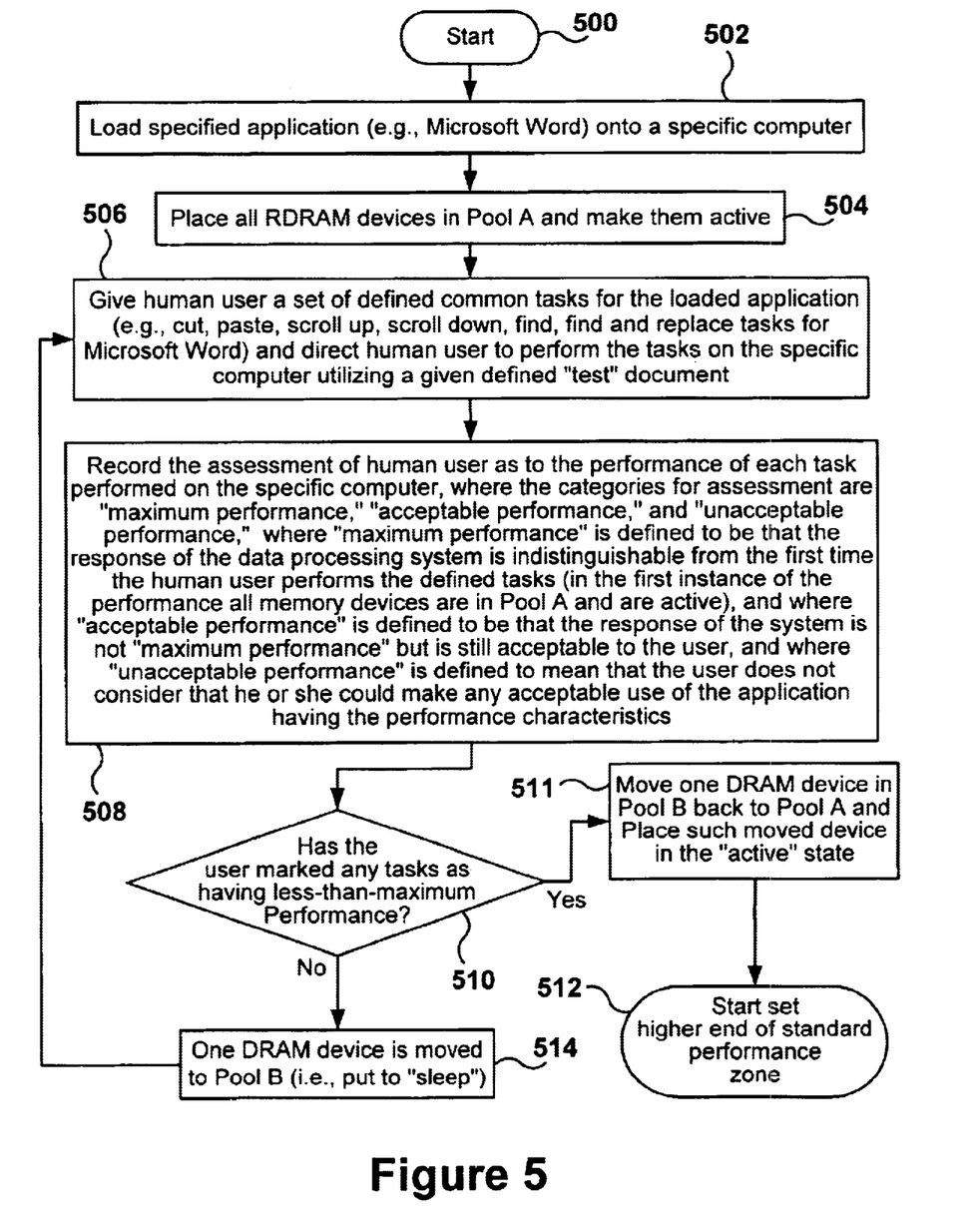
FIGS. 5 and 6 illustrate how an upper bound pooling policy of a standard performance zone is determined.
Figure 6:
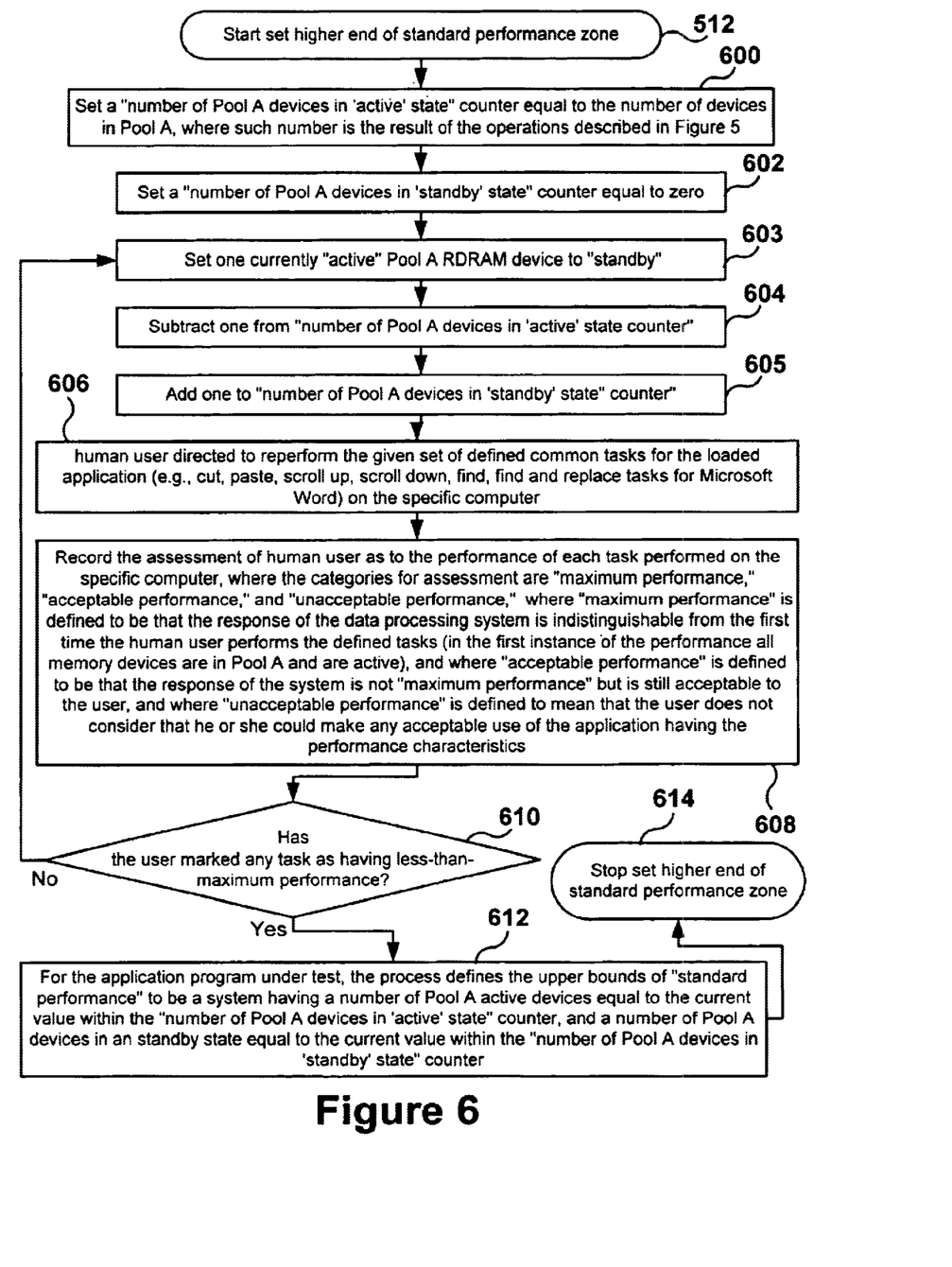

The processes illustrated in FIGS. 3 and 4 have set the lower bounds of acceptable performance for the application under test. Consequently, since a used herein the "maximum battery life" selection in FIG. 1 equates to the absolute minimum acceptable performance, it is known that the lower bound of the "maximum battery life" zone equates to the lower bounds of acceptable user performance defined by the operations of FIGS. 3 and 4. FIGS. 5 and 6 show how in one embodiment the upper bounds of a standard performance zone are set.

Referring now to FIGS. 5 and 6, shown is a process which defines the minimum number of pool A active devices necessary to achieve maximum user defined performance. Method step 500 shows the start of the process. Method step 502 depicts that a specified application (e.g., Microsoft Word) is loaded onto a specific computer (e.g., a portable computer system utilizing Rambus DRAM). Method step 504 illustrates that all devices are placed in pool A and made active. Method step 506 shows that a human user is given a set of defined common tasks for the loaded application (e.g., cut, paste, scroll up, scroll down, find, find and replace tasks for Microsoft Word) and asked to perform the tasks on the specific computer utilizing a given defined document. Method step 508 illustrates that the human user is instructed to record the performance as maximum performance for each task performed in specific recordation categories, where the recordation categories are for assessment are "maximum performance," "acceptable performance," and "unacceptable performance," where "maximum performance" is defined to be that the response of the data processing system is indistinguishable from the first time the human user performs the defined tasks (in the first instance of the performance all memory devices are in Pool A and are active), and where "acceptable performance" is defined to be that the response of the system is not "maximum performance" but is still acceptable to the user, and where "unacceptable performance" is defined to mean that the user does not consider that he or she could make any acceptable use of the application having the performance characteristics. That is, the human user is instructed that performance of the application the first time through, with all the memory devices activated, is the "baseline" performance against which subsequent performances of the application are to measured, and thus the first time though the process described in relation to FIG. 5, the user is to mark all tasks as having "maximum performance."

Method step 510 shows the inquiry as to whether the user has marked any task as having less-than-maximum performance. If the inquiry of method step 510 yields a determination that a task has been marked as having lass-than-maximum performance, the process proceeds to method step 511, which shows that one DRAM is moved back to Pool A and set "active" (in order to restore the system to the last state in which it had acceptable performance. Thereafter, the process proceeds to method step 512 which depicts the start of the "set higher end of standard performance zone process" of FIG. 6.

If the inquiry of method step 510 yields a determination that a task has NOT been marked as having lass-than-maximum performance, the process proceeds to method step 514 which illustrates that one DRAM device is moved to pool B (i.e., put to "nap"). Thereafter, the process returns to method step 506.

At the completion of the process shown in FIG. 5, it is known what minimum number of pool A memory devices are necessary to obtain the performance the user finds equivalent to "maximum performance" (i.e., the number of memory devices in the pool when the process described in FIG. 5 terminates).

With reference now to FIG. 6, illustrated is "set higher end of standard performance zone process." Recall that pool A devices can be placed into an "standby" mode, which actually consumes less power than active mode. The process of FIG. 5 gave the minimum number of active devices in pool A required for "maximum performance." The process of FIG. 6 determines how many (if any) of such minimum number of active devices can be placed in standby state before the user finds the performance of the system to be less-than-maximum. Accordingly, method step 600 shows setting a "number of pool A devices in 'active' state" counter equal to the number of devices in pool A, where such number is the result of the operations described in FIG. 5. Method step 602 shows setting a "number of pool A devices in 'standby' state" counter equal to zero. Thereafter, method step 603 depicts setting one currently "active" pool A RDRAM device to "standby." Subsequently, in response to the operation depicted in method step 603, method step 604 illustrates subtracting one from a "number of pool A devices in 'active' state" counter. Thereafter, again, in response to the operation depicted in method step 603, method step 605 shows adding one to the "number of pool A devices in 'standby' state" counter.

Method steps 606–610 function in substantially the same fashion as method steps 306–310, described above. In the event that the inquiry of method step 610 yields determination that the user has marked the performance of at least one task unacceptable, the process proceeds to method step 612, wherein is depicted that for the application under test, the process defines the lower bounds of "standard performance" to be a system having a number of pool A active devices equal to the current value within the "number of pool A devices in 'active' state" counter, and a number of pool A devices in an standby state equal to the current value within the "number of pool A devices in 'standby' state" counter. Thereafter, the process proceeds to method step 614 and stops.

In the event that the inquiry of method step 610 yields a determination that the user has NOT marked the performance of at least one task unacceptable, the process proceeds to method step 603 and proceeds from that point.

FIGS. 3–6 have defined the upper bound of the "standard performance" mode, and the lower bound of the "maximum battery life" mode. Consequently, one bound remains to be defined: the boundary between the lower end of the standard performance mode and the upper end of the maximum battery life mode. In one embodiment, the boundary between the standard performance mode and the maximum battery life mode is defined to be as follows: (1) if there is at least one inactive device in pool A, the lower bound of the standard performance mode is defined as having one or more of the at least one inactive devices of the defined pool A activated; or (2) if all devices in pool A are already activated, moving one or more Pool B devices to Pool A and activating them.

The foregoing description of FIGS. 3–6 has illustrated a process whereby the pooling policies associated with a particular application are to be determined for a particular human user. In one embodiment, a large number of human users are subjected to the processes described in relation to FIGS. 3–6, and thereafter statistical techniques are utilized with the results generated on the large number of human users to generate profiles for the application under test which should be acceptable across a broad range of human users. For example, the number of active and standby devices in pool A which define the lower bound of the maximum battery life zone could be an average drawn on the results of the processes of FIGS. 3–6 over a large number of persons. Other more sophisticated statistical techniques could also be applied.

Figure 7:
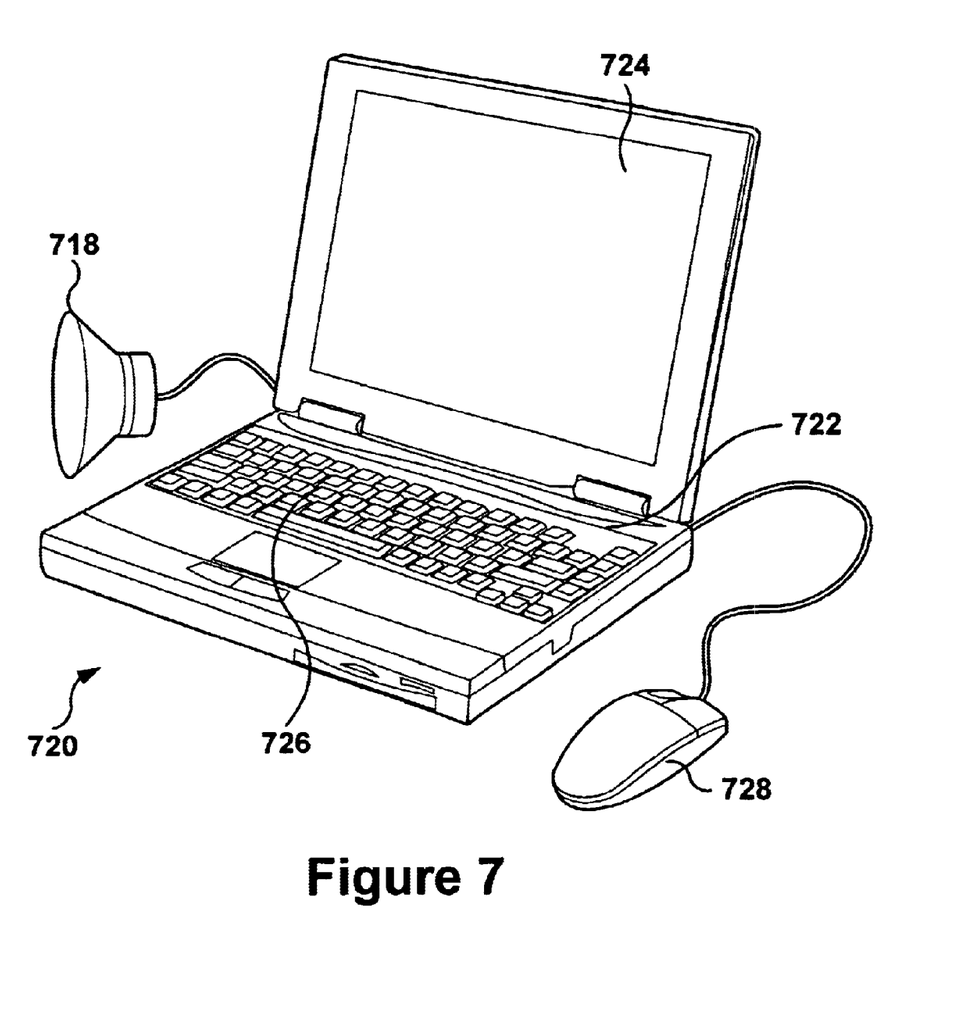
FIG. 7 depicts a pictorial representation of a conventional data processing system which can be utilized in accordance with illustrative embodiments of the graphical user interfaces and processes described herein.

With reference now to FIG. 7, depicted a pictorial representation of a conventional data processing system which can be utilized in accordance with illustrative embodiments of the graphical user interfaces and processes described above. It should be noted that a graphical user interface systems (e.g., Microsoft Windows 98 or Microsoft Windows NT operating systems) and methods can be utilized with the data processing system depicted in FIG. 7. Data processing system 720 is depicted which includes system unit housing 722, video display device 724, keyboard 726, mouse 728, and microphone 748. Data processing system 720 may be implemented utilizing any suitable computer such as a DELL portable computer system, a product of Dell Computer Corporation, located in Round Rock, Tex.; Dell is a trademark of Dell Computer Corporation.

Figure 8:
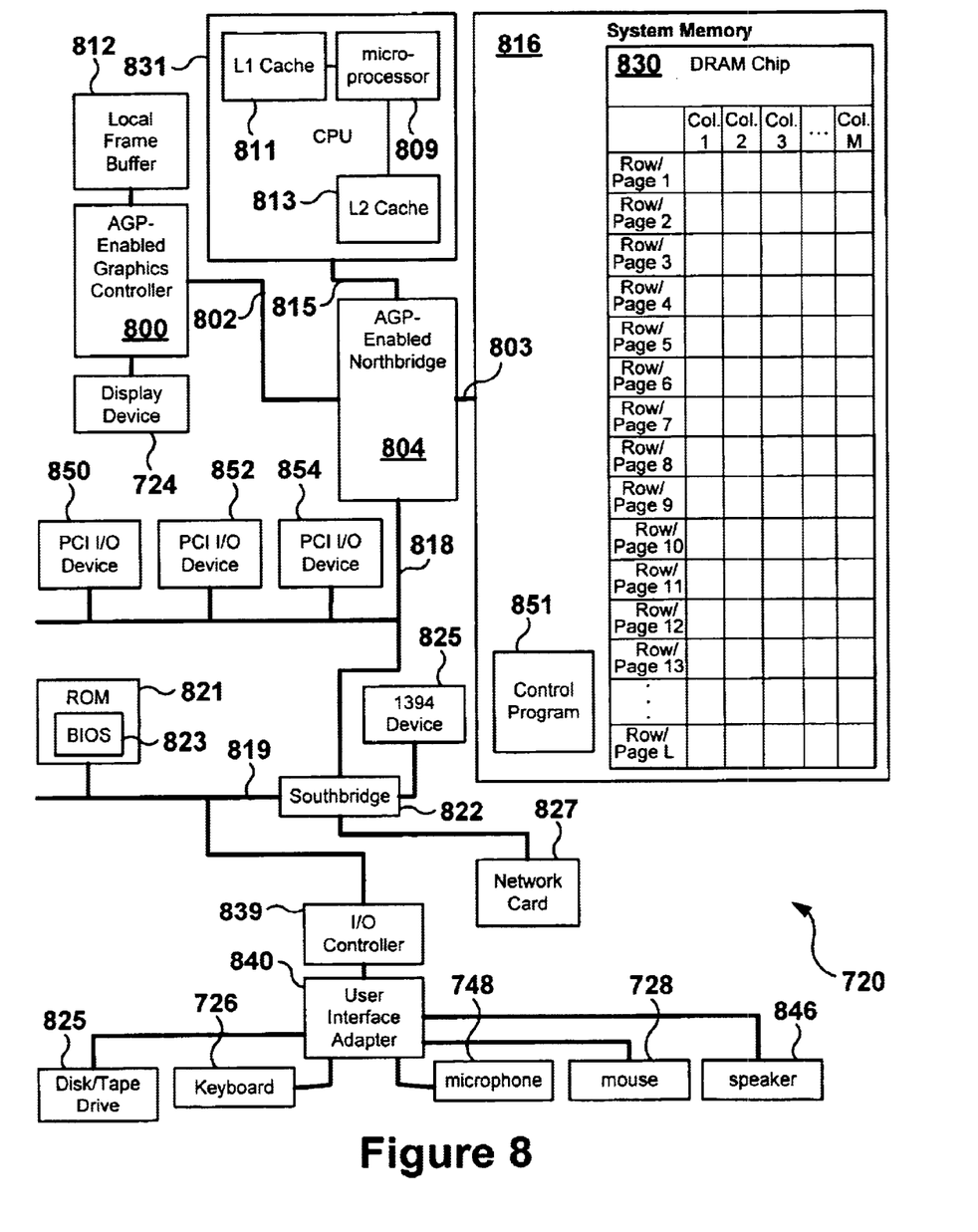
FIG. 8 depicts selected components of data processing system 720 in which illustrative embodiments of the graphical user interfaces and processes described above can be implemented.

Referring now to FIG. 8, depicted are selected components of data processing system 720 in which illustrative embodiments of the graphical user interfaces and processes described above can be implemented. Data processing system 720 includes Central Processing Unit ("CPU") 831 (wherein are depicted microprocessor 809, L1 Cache 811, and L2 Cache 813). CPU 831 is coupled to CPU bus 815.

CPU bus 815 is coupled to AGP-enabled Northbridge 804, which serves as a "bridge" between CPU bus 815, AGP interconnect 802 (a type of data bus), and system memory bus 803. In going from one type of bus to another type of bus, a "bridge" is generally needed because the two different type buses speak a different "language." The term "AGP-enabled" is intended to mean that the so-referenced components are engineered such that they interface and function under the standards defined within the AGP interface specification (Intel Corporation, Accelerated Graphics Port Interface Specification).

Generally, each bus in a system utilizes an independent set of protocols (or rules) to conduct data, which are generally set forth in a product specification uniquely tailored to the type of bus in question (e.g., the PCI local bus specification and the AGP interface specification). These protocols are designed into a bus directly and such protocols are commonly referred to as the "architecture" of the bus. In a data transfer between different bus architectures, data being transferred from the first bus architecture may not be in a form that is usable or intelligible by the receiving second bus architecture. Accordingly, communication problems may occur when data must be transferred between different types of buses, such as transferring data from a PCI device on a PCI bus to a CPU on a CPU bus. Thus, a mechanism is developed for "translating" data that are required to be transferred from one bus architecture to another. This translation mechanism is normally contained in a hardware device in the form of a bus-to-bus bridge (or interface) through which the two different types of buses are connected. This is one of the functions of AGP-enabled Northbridge 804, as well as the Southbridge 822, in that it is to be understood that such bridges can translate and coordinate between various data buses and/or devices which communicate through the bridges.

AGP interconnect 802 interfaces with AGP-enabled graphics controller 800, which interconnects with video display device 724 via video display bus 814. AGP-enabled graphics controller 800 also interconnects with video display device 724 via video display bus 817.

AGP-enabled Northbridge 804 interfaces with system memory bus 803. System memory bus 803 interfaces with system memory 816, which can contain various types of memory devices such as DRAM chip 830, but which also can contain synchronous DRAM, Rambus DRAM, other type memory chips. In addition, shown for sake of illustration is that data processing system 720 includes control program 851 which resides within system memory 816 and which is executed and/or operated on by CPU 831. Control program 851 contains instructions that when executed on CPU 831 carries out application program (e.g., videoconferencing software) operations.

AGP-enabled Northbridge interfaces with Peripheral Component Interconnect (PCI) bus 818, upon which are shown various PCI Input-Output (I/O) devices 850, 852, and 854. Peripheral Component Interconnect (PCI) bus 818 interfaces with Southbridge 822.

Southbridge 822 serves as a bridge between PCI bus 818 and I/O (or ISA) bus 819, 1394 Device 825, and network card 827. I/O bus 819 interfaces with ROM 821, which for sake of illustration is shown containing system BIOS 823.

I/O bus 819 interfaces with I/O controller 839 for connecting peripheral devices (e.g., disk and tape drives 833) to I/O bus 819. I/O controller 839 interfaces with user interface adapter 840 for connecting keyboard 726, mouse 728, speaker 846, microphone 748, and/or other user interface devices, such as a touch screen device (not shown), to I/O bus 819 through I/O controller 839.

Video display device 724 is the visual output of data processing system 720, which can be a CRT-based video display well-known in the art of computer hardware. However, with a portable or notebook-based computer, video display device 724 can be an LCD-based, or a gas plasma-based, or any other type of flat-panel display.

Any suitable machine-readable media may retain the graphical user interface, such as DRAM 830, ROM 821, a magnetic diskette, magnetic tape, or optical disk (the last three being located in disk and tape drives 833). Any suitable operating system such as one having an associated graphical user interface (e.g., Microsoft Windows or Microsoft NT) may direct CPU 831. Other technologies can also be utilized in conjunction with CPU 831, such as touch-screen technology or human voice control.

Those skilled in the art will appreciate that the hardware depicted in FIG. 8 may vary for specific applications. For example, other peripheral devices such as optical disk media, audio adapters, video cameras such as those used in videoconferencing, or programmable devices, such as PAL or EPROM programming devices well-known in the art of computer hardware, and the like may be utilized in addition to or in place of the hardware already depicted.

Those skilled in the art will recognize that data processing system 720 can be described in relation to data processing systems which perform essentially the same functions, irrespective of architectures. For example, another example of such data processing systems, wherein embodiments of the processes and devices described above may be implemented, appears in an Intel Corporation whitepaper, entitled *Intel 820 Chipset: A Revolutionary Architecture for Mainstream Performance PCs* in 2000, which is hereby incorporated by reference in its entirety (see especially FIG. 2, page 6, of the whitepaper). This whitepaper is available from of Intel Corporation of Santa Clara, Calif.

Other embodiments are within the following claims.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that if a specific number of an introduced claim element is intended, such an intent will be explicitly recited in the claim, and in the absence of such recitation no such intent is present. For example, as an aid to understanding, the following appended claims may contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use of definite articles used to introduce claim elements. In addition, even if a specific number of an introduced claim element is explicitly recited, those skilled in the art will recognize that such recitation should typically be interpreted to mean at least the recited number (e.g., the bare recitation of "two elements," without other modifiers, typically means at least two elements, or two or more elements).

What is claimed is:

1. A method comprising:

launching a specified application on a computer system by a user;

placing two or more DRAM devices in a pool A configuration and to make the devices active;

defining a set of common tasks for the user for the specified application;

directing the user to perform the common tasks;

performing the tasks by the user;

assessing the responsiveness of the computer system when performing the tasks recording the assessment of the responsiveness of the computer system when performing the tasks;

determining if the user has indicated if any task has less than a pre-defined level of performance; and if the user has not indicated that any task has less than the pre-defined level of performance, then moving at least one of the two or more DRAM devices to a pool B configuration.

2. The method of claim 1, further comprising:

performing the steps of defining, directing, performing, assessing, recording, and determining until the user indicates that one of the tasks has less than the pre-defined level of performance.

3. The method of claim 2, further comprising:

storing the configuration of pool A and pool B devices as a pooling profile and associating the pooling profile with the application launched by the user.

4. The method of claim 3, wherein when the application is launched by the user, the pooling profile associated with the application is recalled and the two or more DRAM devices are configured according to the pooling profile.

5. The method of claim 1, wherein the pre-defined level of performance is by the user.

6. A computer system comprising:

a processor, storage, two or more DRAM devices, and input devices constructed and arranged to launch a specified application by a user;

the computer system further constructed and arranged to place the two or more DRAM devices in a pool A configuration and make the devices active;

the computer system further constructed and arranged to define a set of common tasks for the user for the specified application;

the computer system further constructed and arranged to direct the user to perform the common tasks;

the computer system further constructed and arranged to enable the user to perform the tasks;

the computer system further constructed and arranged to assess the responsiveness of the computer system when performing the tasks the computer system further constructed and arranged to record the assessment of the responsiveness of the computer system when performing the tasks;

the computer system further constructed and arranged to determine if the user has indicated if any task has less than a pre-defined level of performance; and if the user has not indicated that any task has less than the pre-defined level of performance, then the computer system further constructed and arranged to move at least one of the two or more DRAM devices to a pool B configuration.

7. The system of claim 6, wherein the computer system is further constructed and arranged to perform the steps of defining, directing, performing, assessing, recording, and determining until the user indicates that one of the tasks has less than the pre-defined level of performance.

8. The system of claim 7, wherein the system is further constructed and arranged to store, in the storage, the configuration of pool A and pool B devices as a pooling profile and associating the pooling profile with the application launched by the user.

9. The system of claim 8, wherein when the application is launched by the user, the pooling profile associated with the application is recalled and the two or more DRAM devices are configured according to the pooling profile.

10. The system of claim 6, wherein the pre-defined level of performance is designated by the user.

* * * * *